US007653875B2

(12) United States Patent
Jennings et al.

(10) Patent No.: US 7,653,875 B2
(45) Date of Patent: Jan. 26, 2010

(54) BROWSER SENSITIVE WEB CONTENT DELIVERY (75) Inventors: Claire A. Jennings, Kirkland, WA (US); Douglas A. Boyce, Woodinville, WA (US); Zachary L. Russell, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 670 days.

(21) Appl. No.: 11/101,300

(22) Filed: Apr. 7, 2005

(65) Prior Publication Data
US 2006/0230344 A1 Oct. 12, 2006

(51) Int. Cl.
G06F 17/00 (2006.01)
(52) U.S. Cl. .................. 715/235; 715/200; 715/204; 715/207; 715/230; 715/234; 715/236; 715/238; 715/243
(58) Field of Classification Search ................ 715/200, 715/204, 207, 230, 234–238, 243
See application file for complete search history.

(56) References Cited

U.S. PATENT DOCUMENTS

| 6,023,714 A * | 2/2000 | Hill et al. ................. 715/235 |
| 6,957,394 B1 * | 10/2005 | Fernandez et al. ........... 715/760 |
| 7,251,778 B1 * | 7/2007 | Hill et al. ................. 715/210 |
| 7,278,109 B2 * | 10/2007 | Shalabi et al. .............. 715/762 |
| 7,284,199 B2 * | 10/2007 | Parasnis et al. ............ 715/201 |
| 7,293,034 B2 * | 11/2007 | Paya et al. ................. 707/101 |
| 7,383,498 B1 * | 6/2008 | Hickl et al. ................. 715/235 |
| 7,447,706 B2 * | 11/2008 | Chtcherbatchenko et al. ........ 707/104.1 |
| 7,461,353 B2 * | 12/2008 | Rohrabaugh et al. ........ 715/815 |
| 7,519,915 B2 * | 4/2009 | Shalabi et al. .............. 715/762 |
| 7,584,423 B2 * | 9/2009 | Rohrabaugh et al. ........ 715/238 |
| 2003/0233620 A1 * | 12/2003 | Vedullapalli et al. ........ 715/522 |
| 2003/0237052 A1 * | 12/2003 | Danielsson et al. ......... 715/513 |
| 2004/0046789 A1 * | 3/2004 | Inanoria .................... 345/748 |
| 2006/0224553 A1 * | 10/2006 | Chtcherbatchenko et al. .. 707/1 |
| 2006/0224607 A1 * | 10/2006 | Tchaitchian et al. ........ 707/101 |
| 2006/0236223 A1 * | 10/2006 | Aubert et al. ............... 715/513 |
| 2007/0083534 A1 * | 4/2007 | Uematsu et al. ............ 707/101 |
| 2007/0226612 A1 * | 9/2007 | Sun ........................... 715/526 |

* cited by examiner

*Primary Examiner*—Laurie Ries
*Assistant Examiner*—Chau Nguyen (57) ABSTRACT

Systems and methods directed at providing browser sensitive web content are provided. A web server is configured to receiving a request from a client and to identify a browser in the client from which the request was initiated. A browser specific cascading style sheet (CSS) corresponding to the identified browser is determined. The browser specific CSS includes instructions that enable the browser to handle elements that are provided by a certain version of a CSS standard. The web server incorporates the browser specific CSS into web content and provides the web content with the browser specific CSS to the client in response to the request.

12 Claims, 7 Drawing Sheets

BROWSER SENSITIVE WEB CONTENT DELIVERY

BACKGROUND

In recent years, the Web Wide Web has become one of the most important channels for information sharing and commerce. Traditionally, the structures of web sites are limited by the mechanisms available in the Hyper-Text Markup Language (HTML) standard. More advanced mechanisms are now available to enable the developers to produce more sophisticated web sites. One of these standard mechanisms is Cascading Style Sheet (CSS) managed by Web Wide Web Consortium (W3C). CSS is a mechanism for adding style (e.g. fonts, colors, spacing) to web documents. One or more CSS's may be applied to web page by browsers.

To correctly display a web page with a CSS, a browser must be capable of understanding the associated CSS standard. Unfortunately, some older browsers that are still in use simply cannot handle CSS's. Also, the CSS standard is constantly evolving to meet users' demands. Thus, browsers that are capable of handling an older version of the CSS standard may not be able to handle a web page with a CSS in a newer standard. Thus, if a developer creates a web site with CSS in the newest standard, the web site may not be able to be displayed by a significant number of browsers that are in use.

An effective solution for enabling a browser that is not capable of handling a particular style sheet standard to correctly display a web page structured with that style sheet standard continues to elude those skilled in the art.

DESCRIPTION OF THE DRAWINGS

Like reference numerals are used to designate like parts in the accompanying drawings.

DETAILED DESCRIPTION

The systems and methods described herein are directed at providing browser sensitive web content. A web server is configured to receiving a request from a client and to identify a browser in the client from which the request was initiated. A browser specific cascading style sheet (CSS) corresponding to the identified browser is determined. The browser specific CSS includes instructions that enable the browser to handle elements that are provided by a certain version of a CSS standard. The web server incorporates the browser specific CSS into web content and provides the web content with the browser specific CSS to the client in response to the request.

Figure 1:
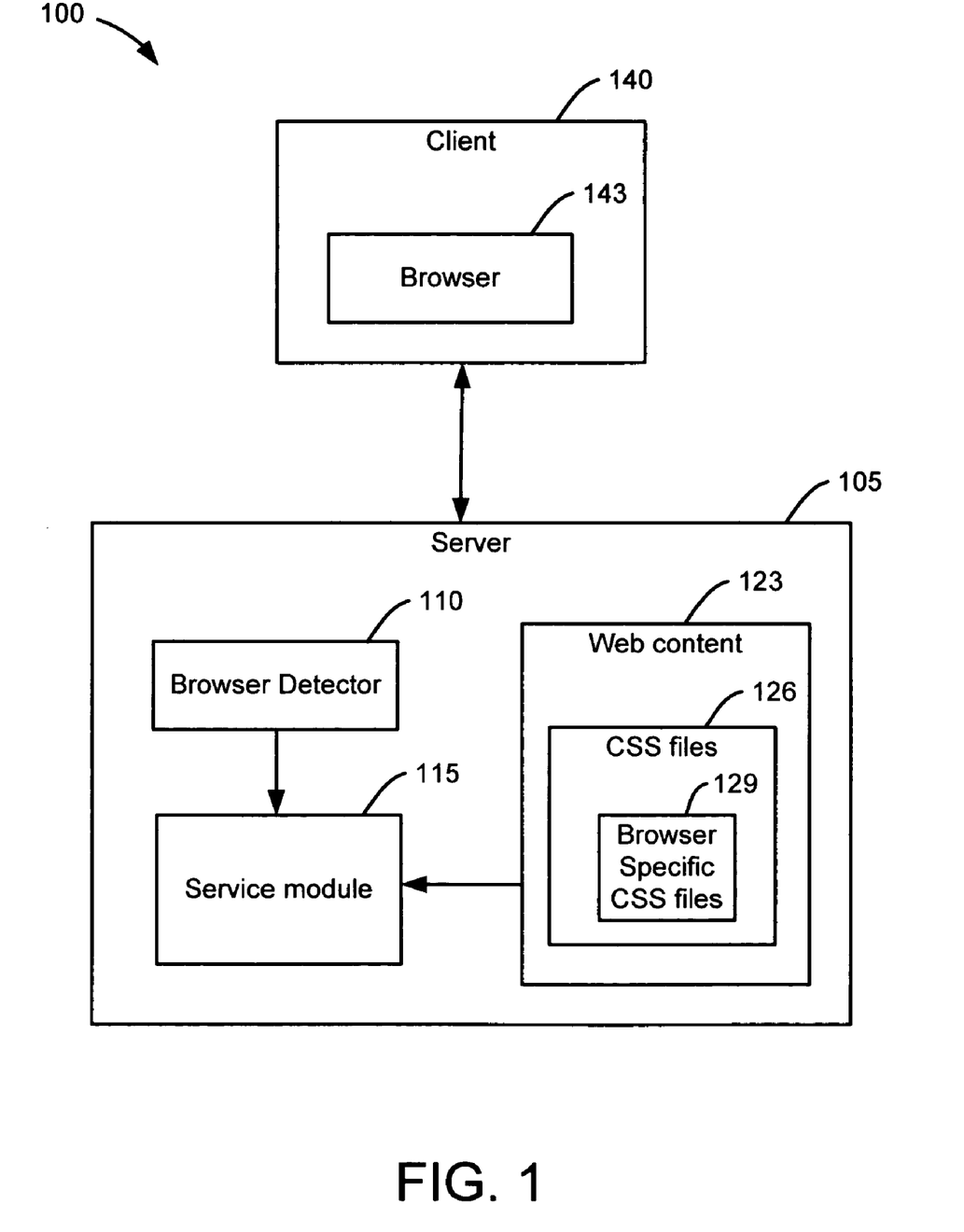
FIG. 1 shows an example system for providing web content that is sensitive to a browser.

FIG. 1 shows an example system 100 for providing web content that is sensitive to a browser. Server 105 is configured to receive a request for web pages from browser 143 in client 140. Server 105 includes browser detection module 110 and service module 115. Browser detector 110 is configured to identify the type and version of browser 143. For example, browser detector 110 may be configured to identify a browser agent string included in the request and to determine the type and version of browser 143 from the browser agent string. Based on the type and version of browser 143, browser detector 110 may be configured to determine the level of content that the browser will receive from server 105. In particular, browser detector 110 may indicate the determined level of content in a browser identifier. This browser identifier is used by service module 115 to determine which the level of content is provided in response to the request from browser 143.

Service module 115 is configured to provide web content 123 to browser 143 in response to a request. Typically, service module 115 is configured to provide web content at different levels. For example, service module 115 may be configured to provide up-level and down-level web content. Down-level web content may be implemented without style sheets or scripts and is provided to browsers without the capabilities to handle such style sheets or scripts. Up-level content may include advanced content, such as one or more style sheets or scripts, and is provided to browsers that are capable of handling such advanced content. In particular, service module 115 may be configured to include cascading style sheet (CSS) files 126 in the web content that is provided to up-level browsers. Service module 115 may configured to determine the capability of the browser using a browser detection mechanism that is implemented as part of service module 115 or as a separate module. If the service module 115 is only configured to distinguish browsers into either up-level or down-level, then a significant number of browsers may unnecessarily receive downgraded content. For example, an advanced browser may receive down-level content just because the browser lacks the capabilities of handling a minor and insignificant set of the CSS functionalities.

In this example, service module 115 is further configured to identify a browser level identifier provided by browser detector 110. This browser level identifier may indicate levels in addition to up-level and down-level. In particular, the browser level identifier may indicate a level that is associated with the type and version of a particular browser. Typically, each level is associated with one of the browser specific CSS files 129. Browser specific CSS files 129 include style sheets that can be handled by the corresponding browsers. For example, if a particular browser identified by a browser level identifier is not capable of handling some instructions of a certain style sheet standard, the browser specific CSS file associated with the browser level identifier may be configured to include instructions that can be handled by the browser to correctly render the desired web page.

The components illustrated in FIG. 1 are just some examples of components that can be used to implement the example system 100 for providing web content that is sensitive to a browser. Other components and configurations may be used to achieve the same functionalities. For example, service module 115 may be configured to only apply standard CSS files for up-level browser or not apply the CSS files for down-level browser. Another module may be used to modify the applied CSS files for the specific browser identified by browser detector 110.

In another example, service module 115 may be implemented as an ASP.NET system. For this example, browser detector 110 may be configured as code that is built on top of the ASP.NET layer. In this configuration, browser detector 110 is implemented as an extension to the ASP.NET system.

It is to be appreciated that the example system 100 in FIG. 1 enables an administrator to quickly configure server 105 to be responsive to a new browser. For example, the administrator for web content 123 can easily respond to a new version of a browser by configuring browser detector 110 to detect that browser and to provide browser specific CSS files 129 that can be handled by the browser. This functionality is also useful when web content in a new style sheet format is provided. The ability to provide browser specific web content would be useful for current browsers that have not adapted to the new style sheet format.

Figure 2:
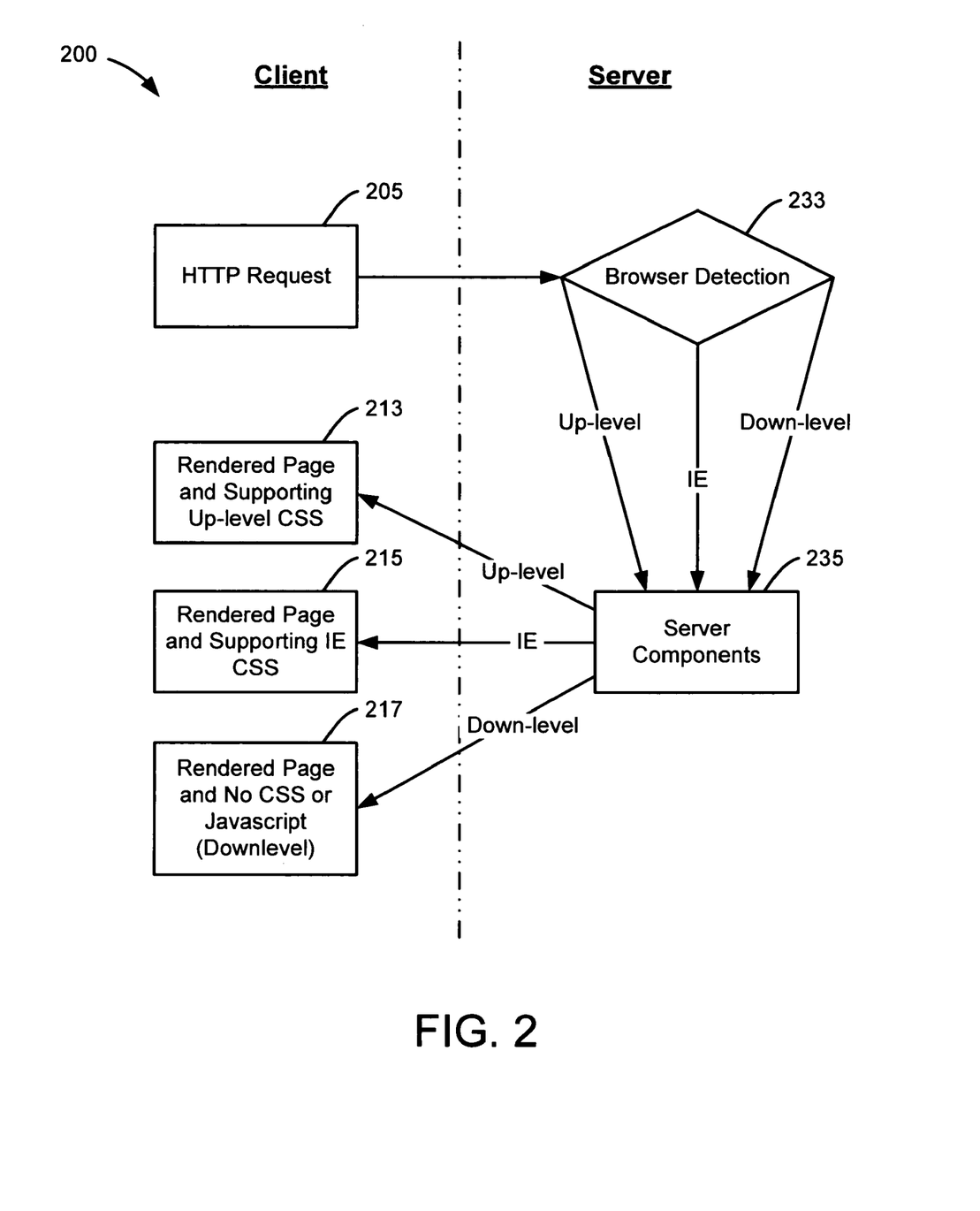
FIG. 2 shows an example work flow for providing a browser sensitive web page to a browser.

FIG. 2 shows an example work flow 200 for providing a browser sensitive web page to a browser. Work flow 200 includes a Hyper-Text Transfer Protocol (HTTP) request 205 sent by a client to a server. HTTP request 205 is associated with a browser agent string that identifies the type of the browser. The browser agent string may also identify the version of the browser. When the HTTP request 205 is received by the server, the request is passed to browser detection process 233. Browser detection process 233 identifies the type and version of the browser from the browser agent string in HTTP request 205. Based on this information, browser detection process 233 sets an identifier that indicates the level of web content that should be sent in response to HTTP request 205. The identifier may indicate up-level or down-level. The identifier may also indicate a specific browser type and/or version. As shown in FIG. 2, the identifier may indicate an Internet Explorer (IE) browser.

The identifier is provided server components 235 that are configured to provide web content in response to HTTP requests. Depending on the indication in the identifier, server components 235 may provide up-level content, down-level content, or browser specific content. The web content is sent to client in response to HTTP request 205. As shown in FIG. 2, web pages may be rendered by the client from the different web content that is provided, depending on the browser in the client. For example, if the client has a browser capable of handling CSS's of the up-level web content provided by the server, the web content provided by server components 235 would enable the client to render web page 213 that includes an up-level CSS file.

If the client has a browser that does not have the capability to handle some of the up-level CSS elements but has the ability to create the same functionality provided by the up-level CSS file using a browser specific CSS file, the web content provided by server components 235 would enable the client to render web page 215 using the browser specific CSS file. In FIG. 2, web page 215 includes a CSS file that is specific to the IE browser.

If the client has a browser that does not have the capability to handle advanced level content, such as CSS or scripts, server components 235 will provide down-level web content without any of the advanced level content. As shown in FIG. 2, the provided web content in this case allows the client to render web page 217 without CSS or javascripts.

Figure 3:
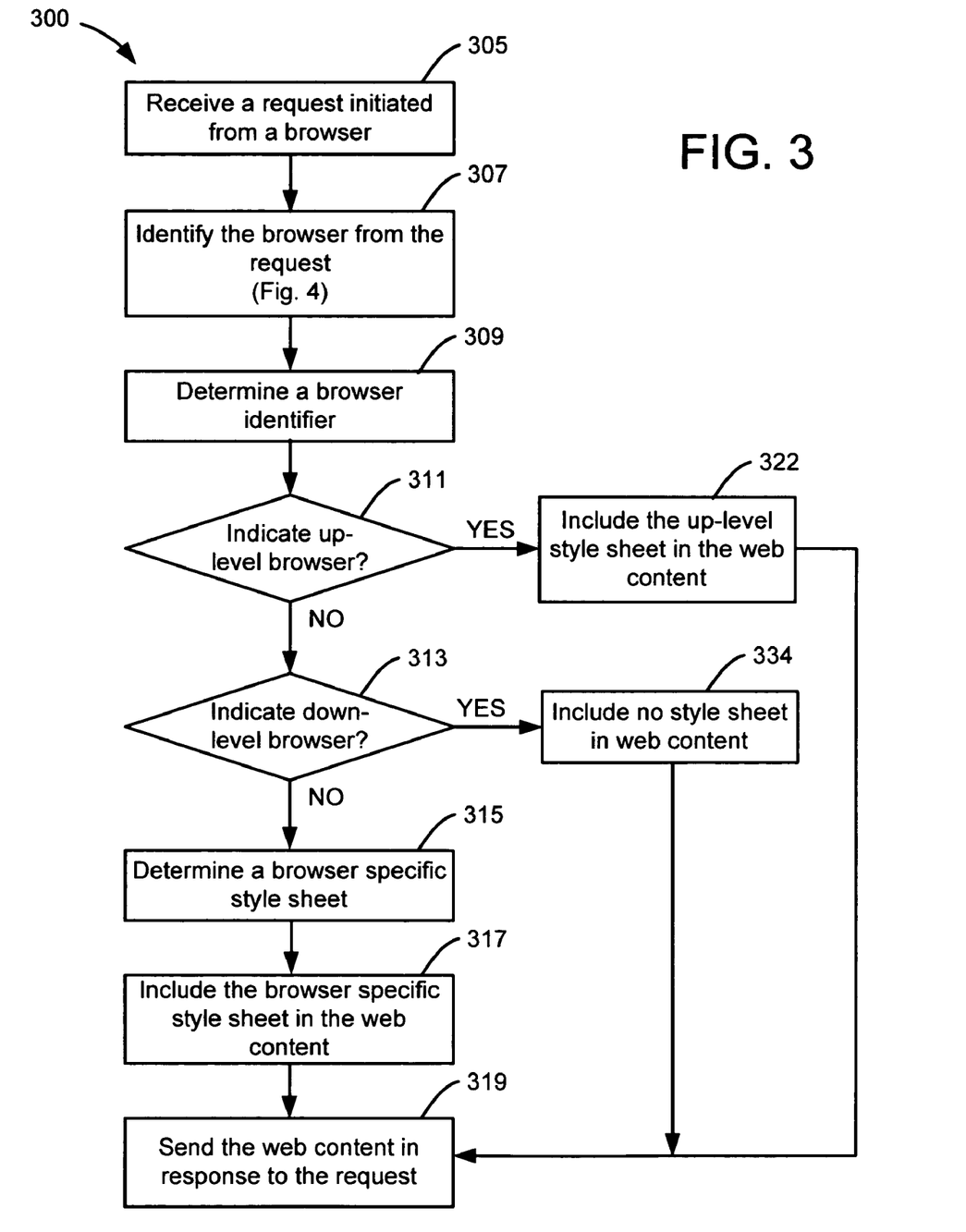
FIG. 3 shows an example process for providing browser sensitive web content.

FIG. 3 shows an example process 300 for providing browser sensitive web content. Process 300 may be implemented by a web server to provide content for a web page for rendering by a browser on a client. At block 305, a request for a web page initiated by a browser is received. The request is typically a HTTP request, which may include a variety of information. At block 307, the browser is identified from the request. The type and version of the browser may be identified. At block 309, a browser identifier is determined. The browser identifier indicates the level of web content that is to be provided to the requesting browser. At decision block 311, a determination is made whether the browser identifier indicates an up-level browser. If so, process 300 moves to block 322 where one or more up-level style sheets are included in the web content. Process 300 then continues at block 319.

Returning to decision block 311, if the browser identifier does not indicate an up-level browser, process 300 moves to decision block 313 where a determination is made whether the browser identifier indicates a down-level browser. If so, process 300 continues at block 334 where the web content is assembled without any advanced content, such as style sheets or javascripts.

Returning to decision block 313, if the browser identifier indicates neither an up-level browser nor down-level browser, then the browser identifier indicates a particular browser. At block 315, one or more browser specific style sheets corresponding to the browser identifier are determined. These browser specific style sheets typically include elements that are included to achieve the same functionalities as those produced with the up-level style sheets. Browser specific style sheets may be applied in place of other style sheets of the up-level content. Browser specific style sheets may also be CSS files that are applied in addition to the style sheets of the up-level content and may include instructions that would enable the browser to render elements specified in the up-level style sheets. At block 317, the one or more browser specific style sheets are included in the web content. At block 319, the web content is sent to the client in response to the request.

Figure 4:
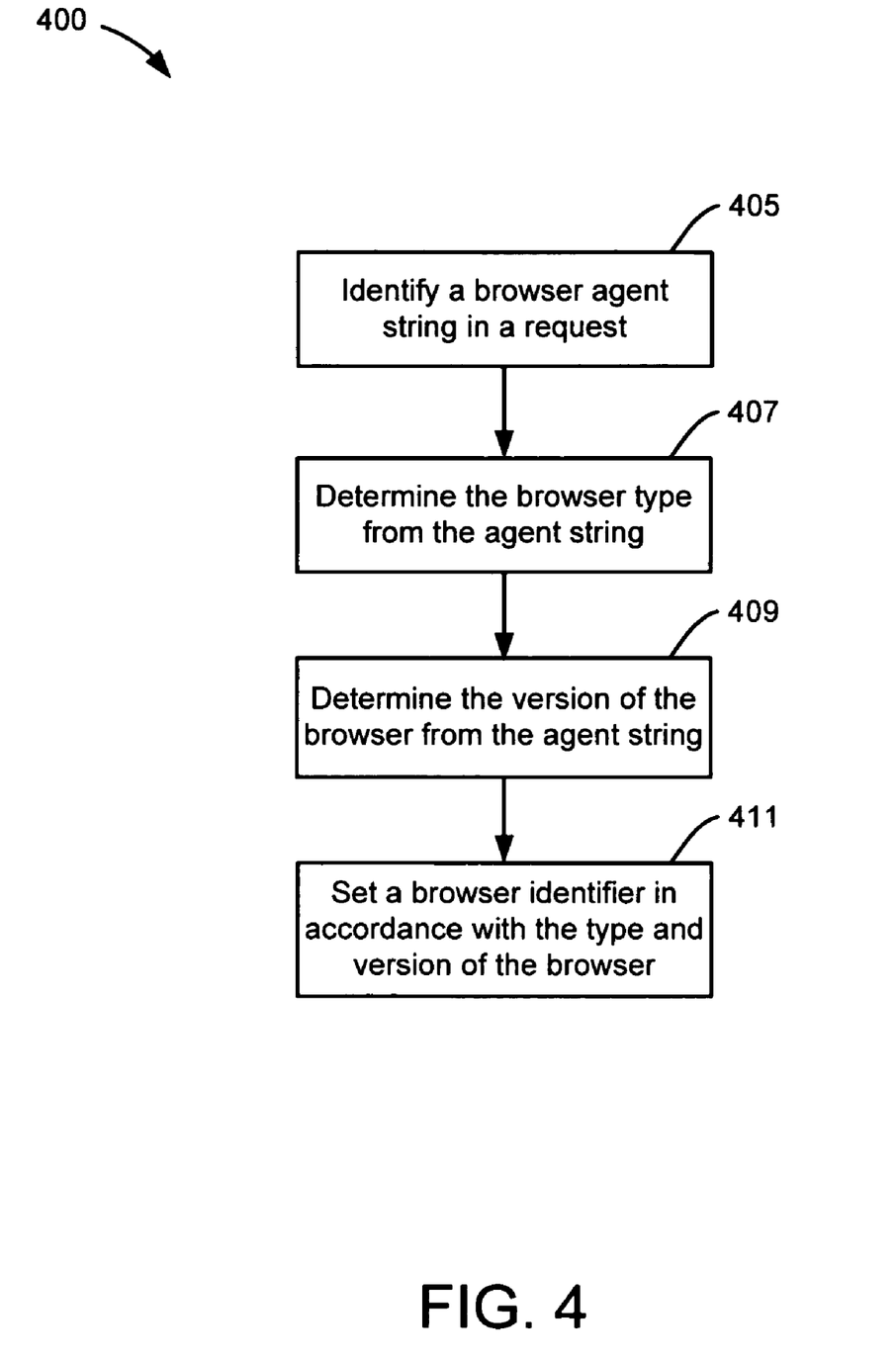
FIG. 4 shows an example process for identifying a browser that sends a request for web content.

FIG. 4 shows an example process 400 for identifying a browser that sends a request for web content. Process 400 may be implemented by a browser detector in a server to identify a browser for providing web content that can be handled by that browser. At block 405, a browser agent string associated with a request that is initiated by a browser in a client is identified. At block 407, the browser type is determined from the agent string. At block 409, the version of the browser is also determined from the agent string. At block 411, a browser identifier is set in accordance with the type and version of the browser. The browser identifier may be used by the service module of the server to provide browser sensitive web content.

Figure 5:
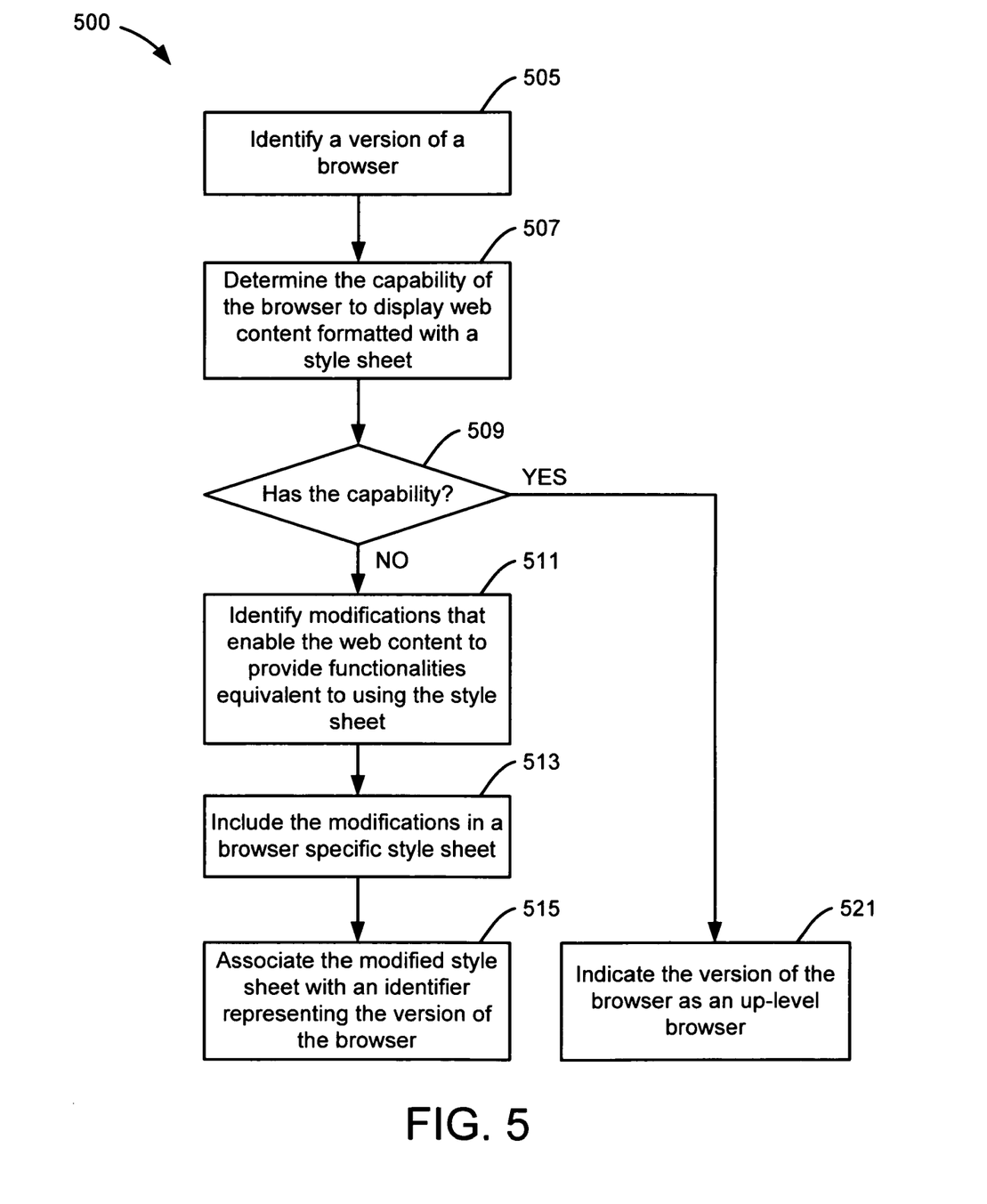
FIG. 5 shows an example process for configuring a server to provide web content that is sensitive to the capability of a particular browser.

FIG. 5 shows an example process 500 for configuring a server to provide web content that is sensitive to the capability of a particular browser. At block 505, a version of a browser is identified. At block 507, the capability of the browser to display web content formatted with one or more style sheets is determined. Typically, the style sheets include one or more CSS's that conform to a particular standard, such as CSS2 standard managed by W3C. At decision block 509, a determination is made whether the browser has the capability to handle the style sheets. If so, process 500 moves to block 521 where the version of the browser is indicated as an up-level browser.

Returning to decision block 509, if the browser does not have the capability to handle the style sheets, process 500 moves to block 511 where modifications that enable the web content to provide functionalities equivalent to using the one or more style sheets in the particular standard are identified. At block 513, the modifications are included in a browser specific style sheet. At block 515, the modified style sheet is associated with an identifier representing the version of the browser.

Below are example codes that may be used by a web server to provide browser sensitive web content to browsers for rendering a web page:

```
/// <summary>
/// This is to define the three browser buckets we have.
/// IE and BROWSER2 are both uplevel browser types, but
/// requires different client code to render the same.
/// </summary>
public enum GenericBrowserType {
   IE, BROWSER2, Downlevel
}
/// <summary>
/// The Generic Browser Type
/// </summary>
public GenericBrowserType clientType;
/// <summary>
/// Detect the Client properly.
/// </summary>
public static void DetectClientType(HttpContext current-
   Context, ref GenericBrowserType clientType, ref string
   clientTarget) {
   bool stompClientTarget=false;
   if (currentContext.Request.Browser.MajorVersion>=5)
{
if (currentContext.Request.Browser.Browser=="IE") {
   clientType=GenericBrowserType.IE;
}
else                                                   if
   (currentContext.Request.Browser.Browser=="Opera"
   &&
   currentContext.Request.Browser.Platform=="MacPPC")
   {
   clientType=
GenericBrowserType.Downlevel;
}
else
   clientType=GenericBrowserType.BROWSER2;
   stompClientTarget=true;
}
// Removed redundant check for BROWSER2 bucket using
   the User Agent string. If this is needed the check should
   be for if not IE, as the IE bucket is exclusive, for just IE,
   and the BROWSER2 bucket is inclusive, for all other
   high level browsers.
if  (currentContext.Request.UserAgent.ToUpper(  ).In-
   dexOf("IE")==-1) {
   clientType=GenericBrowserType.BROWSER2;
}
if(currentContext.Request.Browser.Browser=="IE" &&
   currentContext.Request.Browser.Platform
   "MacPPC") {
   clientType=
GenericBrowserType.Downlevel;
   clientTarget="downlevel";
}
}
else
   clientType=GenericBrowserType.Downlevel;
}
if(stompClientTarget) {
   currentContext.Items["clienttype"]=clientType;
   clientTarget="ie5";
}
}
```

Figure 6:
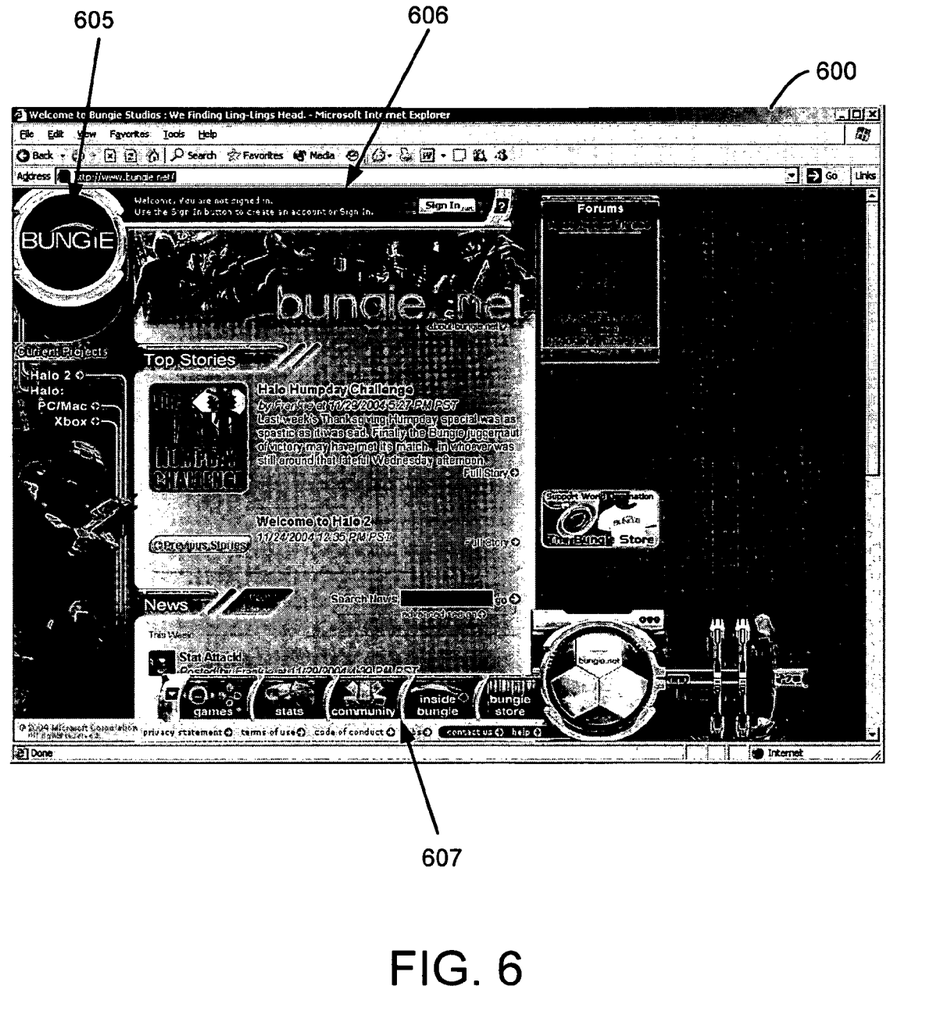
FIG. 6 shows an example screen shot of a web page with navigational elements provided by the CSS2 standard that is rendered by a browser that is not capable of handling the CSS2 navigational elements.

FIG. 6 shows an example screen shot 600 of a web page with navigational elements 605-607 provided by the CSS2 standard that is rendered by a browser that is not capable of handling the CSS2 navigational elements. The web server that services the web page is configured to provide web content that is sensitive to the browser. In particular, the web content includes a browser specific CSS that enables the browser to render a web page with elements that are equivalent to the CSS2 navigational element.

Below is one example CSS for the web page that is provided by the server for up-level browsers:
BODY {
   PADDING-RIGHT: 0px; PADDING-LEFT: 0px; PADDING-BOTTOM: 0px; MARGIN: 0px; PADDING-TOP: 0px; FONT-FAMILY: Arial, Helvetica, sans-serif
}
Below is an example browser specific CSS of the web page that is provided by the server for IE browsers:
BODY{
OVERFLOW-Y: hidden
}
mainStatic {
OVERFLOW: auto; HEIGHT: 100%
}

Figure 7:
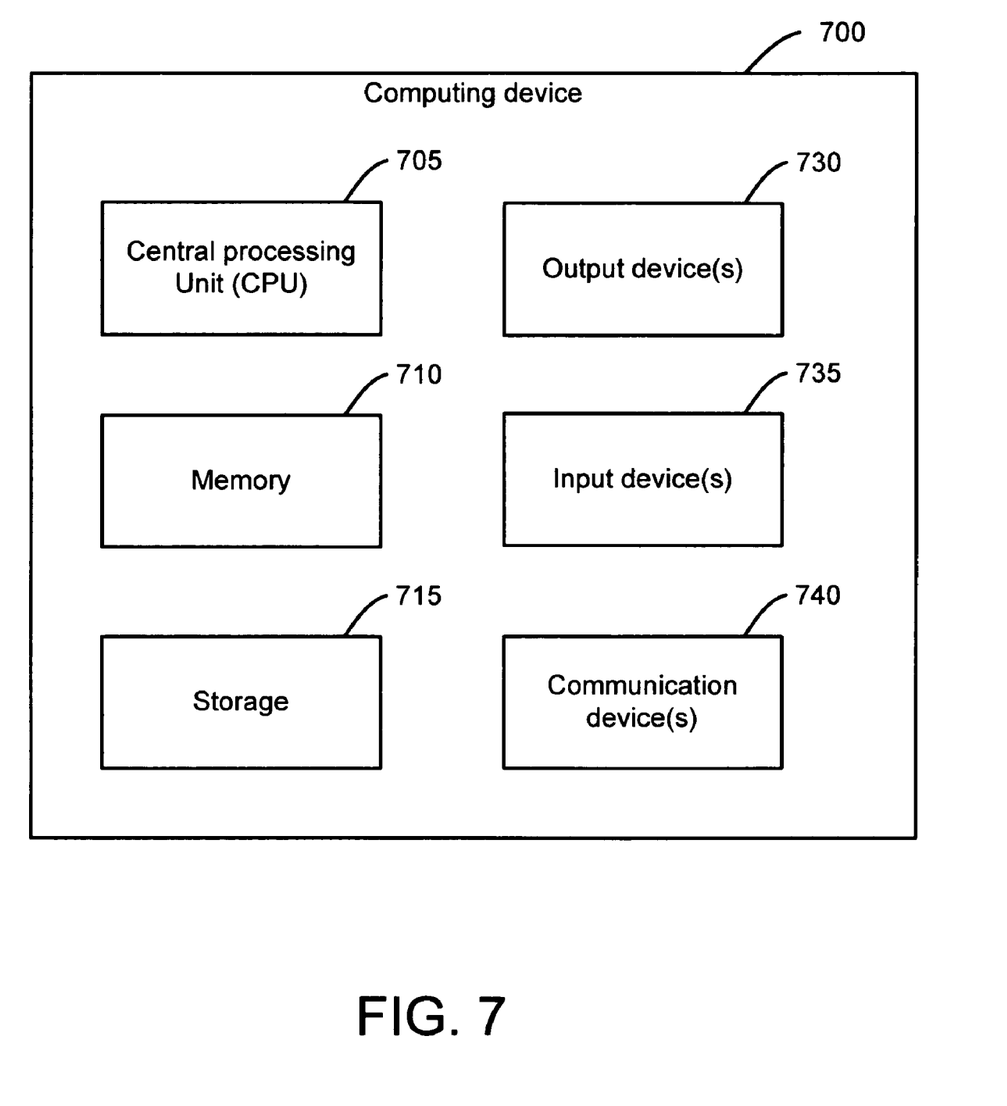
FIG. 7 shows an exemplary computer device for implementing the described systems and methods.

FIG. 7 shows an exemplary computer device 700 for implementing the described systems and methods. In its most basic configuration, computing device 700 typically includes at least one central processing unit (CPU) 705 and memory 710.

Depending on the exact configuration and type of computing device, memory 710 may be volatile (such as RAM), non-volatile (such as ROM, flash memory, etc.) or some combination of the two. Additionally, computing device 700 may also have additional features/functionality. For example, computing device 700 may include multiple CPU's. The described methods may be executed in any manner by any processing unit in computing device 700. For example, the described process may be executed by both multiple CPU's in parallel.

Computing device 700 may also include additional storage (removable and/or non-removable) including, but not limited to, magnetic or optical disks or tape. Such additional storage is illustrated in FIG. 7 by storage 715. Computer storage media includes volatile and nonvolatile, removable and non-removable media implemented in any method or technology for storage of information such as computer readable instructions, data structures, program modules or other data. Memory 710 and storage 715 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 700. Any such computer storage media may be part of computing device 700.

Computing device 700 may also contain communications device(s) 740 that allow the device to communicate with other devices. Communications device(s) 740 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 700 may also have input device(s) 735 such as keyboard, mouse, pen, voice input device, touch input device, etc. Output device(s) 730 such as a display, speakers, printer, etc. may also be included. All these devices are well know in the art and need not be discussed at length.

While the preferred embodiment of the invention has been illustrated and described, it will be appreciated that various changes can be made therein without departing from the spirit and scope of the invention.

The invention claimed is:

1. A method for providing web content steps:
   receiving at a server a request for the web content from a client;
   identifying from the server a browser in the client from which the request was initiated;
   determining from the server whether the browser is capable of displaying up-level web content, down-level web content, or browser specific web content, wherein a level of the web content capable of being displayed by the browser corresponds to a type and version of the browser, wherein up-level web content includes one or more style sheets or scripts and down-level web content is implemented without style sheets or scripts;
   if the browser is determined to be capable of displaying up-level web content, then the server:
      identifying one or more cascading style sheets (CSS) corresponding to up-level browsers;
      incorporating the one or more up-level CSS's into the web content; and
      providing the web content with the one or more up-level CSS's to the client in response to the request;
   if the browser is determined to be capable of displaying down-level web content, then the server:
      assembling the web content without any CSS's; and
      providing the web content to the client in response to the request;
   if the browser is determined to not have the capability to display up-level web content or down-level web content, then the server:
      identifying instructions that enable the browser to display the web content formatted with the one or more up-level CSS's;
      configuring a browser specific CSS corresponding to the identified instructions that enable the browser to display the web content formatted with the one or more up-level CSS's;
      incorporating the browser specific CSS into the web content; and
      providing the web content with the browser specific CSS to the client in response to the request.

2. The method for providing web content as recited in claim 1, further comprising:
   identifying a browser agent string associated with the request; and
   determining the browser from the browser agent string.

3. The method for providing web content as recited in claim 2, further comprising:
   setting a browser identifier to indicate the browser; and
   determining the browser specific CSS corresponding to the indication in the browser identifier.

4. The method for providing web content as recited in claim 3, further comprising:
   determining at least one of a version or a type of the browser from the agent string; and
   setting the browser identifier in accordance with the determination.

5. The method for providing web content as recited in claim 1, further comprising:
   including the instructions in the browser specific CSS; and
   associating the browser specific CSS with the browser.

6. The method for providing web content as recited in claim 1, further comprising:
   modifying an existing CSS to include the instructions; and
   incorporating the modified CSS in the web content.

7. A web server including one or more central processing unit and memory and one or more computer storage media encoded with computer-executable components for providing web content in response to requests from clients, the computer-executable components comprising:
   a detector configured to identify a browser from which a request for web content was initiated, the detector further configured to determine a level of web content that the browser will receive from the web server in response to the request and to indicate the level in a browser identifier; and
   a service module configured to identify a the browser identifier provided by the detector and to determine whether the browser is capable of displaying up-level web content, down-level web content, or browser specific web content, wherein a level of the web content capable of being displayed by the browser corresponds to a type and version of the browser, wherein up-level web content includes one or more style sheets or scripts and down-level web content is implemented without style sheets or scripts;
   if the browser is determined to be capable of displaying up-level web content, then the service module:
      identifying one or more cascading style sheets (CSS) corresponding to up-level browsers;
      incorporating the one or more up-level CSS's into the web content; and
      providing the web content with the one or more up-level CSS's in response to the request;
   if the browser is determined to be capable of displaying down-level web content, then the service module:
      assembling the web content without any CSS's; and
      providing the web content in response to the request;
   if the browser is determined to not have the capability to display up-level web content or down-level web content, then the service module:
      identifying instructions that enable the browser to display the web content formatted with the one or more up-level CSS's;
      configuring a browser specific CSS corresponding to the identified instructions that enable the browser to display the web content formatted with the one or more up-level CSS's;
      incorporating the browser specific CSS into the web content; and
      providing the web content with the browser specific CSS in response to the request.

8. The web server as recited in claim 7, wherein the detector is further configured to determine the level of web content that the browser will receive based, at least in part, on a capability of the browser to handle a CSS standard.

9. The web server as recited in claim 7, wherein the detector is configured to determine the level of web content that the browser will receive based, at least in part, on whether the browser specific CSS for the browser is available.

10. The web server as recited in claim 7, wherein the detector is further configured to identify the browser based, at least in part, on a browser agent string associated with the request.

11. A web server comprising:
- at least one processing unit and at least one memory;
- means for receiving an hyper-text transfer protocol (HTTP) request initiated from a browser in a client;
- means for identifying the browser from a browser agent string associated with the HTTP request;
- means for determining whether the browser is capable of displaying up-level web content, down-level web content, or browser specific web content, wherein a level of the web content capable of being displayed by the browser corresponds to a type and version of the browser, wherein up-level web content includes one or more style sheets or scripts and down-level web content is implemented without style sheets or scripts;
- if the browser is determined to be capable of displaying up-level web content, then:
  - means for identifying one or more cascading style sheets (CSS) corresponding to up-level browsers;
  - means for incorporating the one or more up-level CSS's into the web content; and
  - means for providing the web content with the one or more up-level CSS's to the client in response to the request;
- if the browser is determined to be capable of displaying down-level web content, then:
  - means for assembling the web content without any CSS's; and
  - means for providing the web content to the client in response to the request;
- if the browser is determined to not have the capability to display up-level web content or down-level web content, then:
  - means for identifying instructions that enable the browser to display the web content formatted with the one or more up-level CSS's;
  - means for configuring a browser specific CSS corresponding to the identified instructions that enable the browser to display the web content formatted with the one or more up-level CSS's;
  - means for incorporating the browser specific CSS into the web content; and
  - means for providing the web content with the browser specific CSS to the client in response to the request.

12. The web server as recited in claim 11, further comprising means for including the instructions in the browser specific CSS.

* * * * *